United States Patent
Konno et al.

(10) Patent No.: US 10,368,038 B2
(45) Date of Patent: Jul. 30, 2019

(54) MONITORING CAMERA

(71) Applicant: Sony Corporation, Tokyo (JP)

(72) Inventors: Georgero Konno, Kanagawa (JP);
Makoto Usami, Kanagawa (JP); Norio Ishibashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 14/230,612

(22) Filed: Mar. 31, 2014

(65) Prior Publication Data
US 2014/0211004 A1    Jul. 31, 2014

Related U.S. Application Data (63) Continuation of application No. 11/678,911, filed on Feb. 26, 2007, now abandoned.

(30) Foreign Application Priority Data

Feb. 28, 2006  (JP) ................................ 2006-053285

(51) Int. Cl.
*H04N 7/18* (2006.01)
*G08B 13/196* (2006.01)
*H04N 5/225* (2006.01)

(52) U.S. Cl.
CPC ....... *H04N 7/183* (2013.01); *G08B 13/19626* (2013.01); *H04N 5/2256* (2013.01)

(58) Field of Classification Search
CPC . H04N 7/183; H04N 7/14; B60Q 1/04; G06K 9/2027; G02B 26/10; H05K 13/08; G01B 11/24

(Continued)

(56) References Cited

U.S. PATENT DOCUMENTS

| | | | |
|---|---|---|---|
| 5,903,306 A | 5/1999 | Heckendorn et al. | |
| 6,043,891 A * | 3/2000 | Hartrumpf | G01B 11/24 |
| | | | 356/603 |
| 6,320,610 B1 * | 11/2001 | Van Sant | G02B 26/10 |
| | | | 348/143 |

(Continued)

FOREIGN PATENT DOCUMENTS

| JP | 2002-8410 A * | 1/2002 |
|---|---|---|
| JP | 2002008410 | 1/2002 |

(Continued)

OTHER PUBLICATIONS

Machine translated English equivalent of "JP2005094080", Honda, Apr. 2005.*

(Continued)

*Primary Examiner* — Albert Kir
(74) *Attorney, Agent, or Firm* — K&L Gates LLP (57) ABSTRACT

A monitoring camera includes an image capturing unit configured to capture an image of a subject, the image capturing unit having an image capturing field angle adjustable by a zooming optical system, and a light source having a light emitting diode configured to emit an illuminating radiation. The camera further includes a lens unit configured to apply the illuminating radiation in a direction which is substantially identical to a direction in which the image capturing unit captures the image, and an irradiation moving unit configured to variably set an irradiation range of the illuminating radiation to irradiate an area which is substantially the same as the image capturing field angle of the image capturing unit.

15 Claims, 10 Drawing Sheets (58) Field of Classification Search
USPC ...... 348/143, 14.08, 177; 382/117; 362/276; 356/376, 614
See application file for complete search history.

(56) References Cited

U.S. PATENT DOCUMENTS

| | | | |
|---|---|---|---|
| 2004/0105264 A1* | 6/2004 | Spero | B60Q 1/04 362/276 |
| 2004/0179093 A1* | 9/2004 | Inan | G08B 13/19632 348/36 |
| 2004/0179209 A1* | 9/2004 | Besch | H05K 13/08 356/614 |
| 2004/0263346 A1 | 12/2004 | Neal | |
| 2005/0264679 A1 | 12/2005 | Sasaki et al. | |
| 2006/0119701 A1* | 6/2006 | King | H04N 7/181 348/14.08 |
| 2006/0245623 A1* | 11/2006 | Loiacono | G06K 9/2027 382/117 |
| 2007/0109407 A1 | 5/2007 | Thompson | |
| 2007/0189728 A1 | 8/2007 | Yu | |
| 2008/0151050 A1 | 6/2008 | Self | |

FOREIGN PATENT DOCUMENTS

| | | | | |
|---|---|---|---|---|
| JP | 2004220147 | | 8/2004 | |
| JP | 2005-094080 | | 4/2005 | |
| JP | 2005094080 A | * | 4/2005 | |
| JP | 2006-121363 | | 5/2006 | |
| WO | WO 0074018 A1 | * | 12/2000 | ....... G08B 13/19628 |
| WO | 2001098706 | | 12/2001 | |
| WO | 2006034329 | | 3/2006 | |

OTHER PUBLICATIONS

ELMO_PTC100, Feb. 7, 2005 (Year: 2005).*
Japanese Office Action dated Oct. 27, 2009, for corresponding Japanese Patent Application JP 2006-053285.

* cited by examiner

FIG. 4A
FIELD ANGLE AND IRRADIATION RANGE IN WIDE-ANGLE MODE

FIG. 4B
FIELD ANGLE AND IRRADIATION RANGE IN TELEPHOTO MODE

FIG. 5

FIG.6A
1ST ENERGIZATION PATTERN

FIG.6B
2ND ENERGIZATION PATTERN

COAXIAL LAYOUT

FIG.13B

TWO-AXIS LAYOUT

FIG.13C

MULTI-AXIS LAYOUT

MONITORING CAMERA

CROSS REFERENCES TO RELATED APPLICATIONS

The present application is a continuation of U.S. application Ser. No. 11/678,911, filed Feb. 26, 2007, which claims priority to Japanese Patent Application JP 2006-053285, filed in the Japanese Patent Office on Feb. 28, 2006, the entire contents of which being incorporated herein by reference.

BACKGROUND

The present application relates to a monitoring camera for applying an infrared radiation, for example, to a subject to capture an image of the subject.

In general, there have been provided monitoring cameras for capturing images of suspicious objects or suspicious individuals for security against crimes in shops, on streets, in parking lots, and in various other places. Some monitoring cameras are combined with an infrared projector for projecting an infrared radiation to a subject. The infrared projector is installed near the monitoring camera to apply the infrared radiation to an image capturing range of the monitoring camera. The monitoring camera captures an image of the subject which is irradiated with the infrared radiation. Therefore, the monitoring camera combined with the infrared projector is capable of monitoring a subject and recording its image even at night or in a dark environment.

Monitoring cameras with a camera head swingable back and forth and up and down for an enlarged image capturing range are also in use. Such a monitoring camera may also be combined with a plurality of infrared projectors to cover the swinging angle of the camera head for capturing images in a wide image capturing range. Monitoring cameras incorporating a small-size infrared projector have also been provided.

Japanese Patent Laid-open No. 2004-220147 discloses a monitoring camera equipped with an illuminating infrared source.

The traditional monitoring camera with the projector cannot be remotely controlled to adjust its irradiation angle. Therefore, the projector itself needs to have a sufficiently large irradiation range. If the projector is to maintain a radiation flux density required for the monitoring camera to capture a desired image, then the projector is required to have a large output level. However, in order for the projector to have a large output level, the projector has to be large in size. However, it is difficult to have a large-size projector mounted on a monitoring camera having a motor-driven swingable camera head which is subject to size limitations.

If a monitoring camera is combined with a small-size projector mounted on a camera head thereof, then the projector is capable of providing sufficient illuminance only within a short distance because the projector itself is small in size. When a monitoring camera has its zoom lens shifted toward a telephoto end for capturing an image of a subject in a far position, the amount of a radiation applied to the subject tends to be insufficient if the projector has a fixed projection angle. Therefore, the infrared radiation application capability of the projector limits the image capturing range of the monitoring camera.

SUMMARY

It is desirable to provide a monitoring camera which is capable of appropriately applying a radiation to a subject to capture an image of the subject.

According to an embodiment, there is provided a monitoring camera including an image capturing unit for capturing an image of a subject therein, the image capturing unit having an image capturing field angle adjustable by a zooming optical system, a light source having a light emitting diode for emitting an illuminating radiation, a lens unit for applying the illuminating radiation in a direction which is substantially identical to a direction in which the image capturing unit captures the image, and an irradiation moving unit for variably setting an irradiation range of the illuminating radiation to irradiate an area which is substantially the same as the image capturing field angle of the image capturing unit.

With the above arrangement, the irradiation range of the illuminating radiation can be varied to irradiate the area which is substantially the same as the image capturing field angle of the image capturing unit, and the image of the subject can be captured in the varied irradiation range.

According to another embodiment, there is also provided a monitoring camera including an image capturing unit for capturing an image of a subject therein through an optical system, a light source having a plurality of light emitting diodes for emitting an illuminating radiation, and a controller for controlling energization patterns of the light emitting diodes in synchronism with an image capturing timing interval of the image capturing unit.

With the above arrangement, energization patterns of the light emitting diodes can be controlled in synchronism with the image capturing timing interval of the image capturing unit, and the image of the subject can be captured while the subject is being irradiated with the radiation emitted according to the controlled energization patterns.

Since the irradiation range of the illuminating radiation can be varied to irradiate the area which is substantially the same as the image capturing field angle of the image capturing unit, and the image of the subject can be captured in the varied irradiation range, it is possible to apply an appropriate amount of radiation to illuminate the subject to capture the image thereof.

Furthermore, because energization patterns of the light emitting diodes can be controlled in synchronism with the image capturing timing interval of the image capturing unit, and the image of the subject can be captured while the subject is being irradiated with the radiation emitted according to the controlled energization patterns, the light emitting diodes do not need to be energized at all times, and hence may consume a reduced amount of electric power.

Additional features and advantages are described herein, and will be apparent from, the following Detailed Description and the figures.

DETAILED DESCRIPTION

A monitoring camera according to a first embodiment will be described below with reference to FIGS. 1 through 5. According to the first embodiment, the principles of the invention are applied to a monitoring camera with a zooming function which incorporates therein a light source for applying an infrared radiation to a subject to capture an image of the subject even at night.

Figure 1:
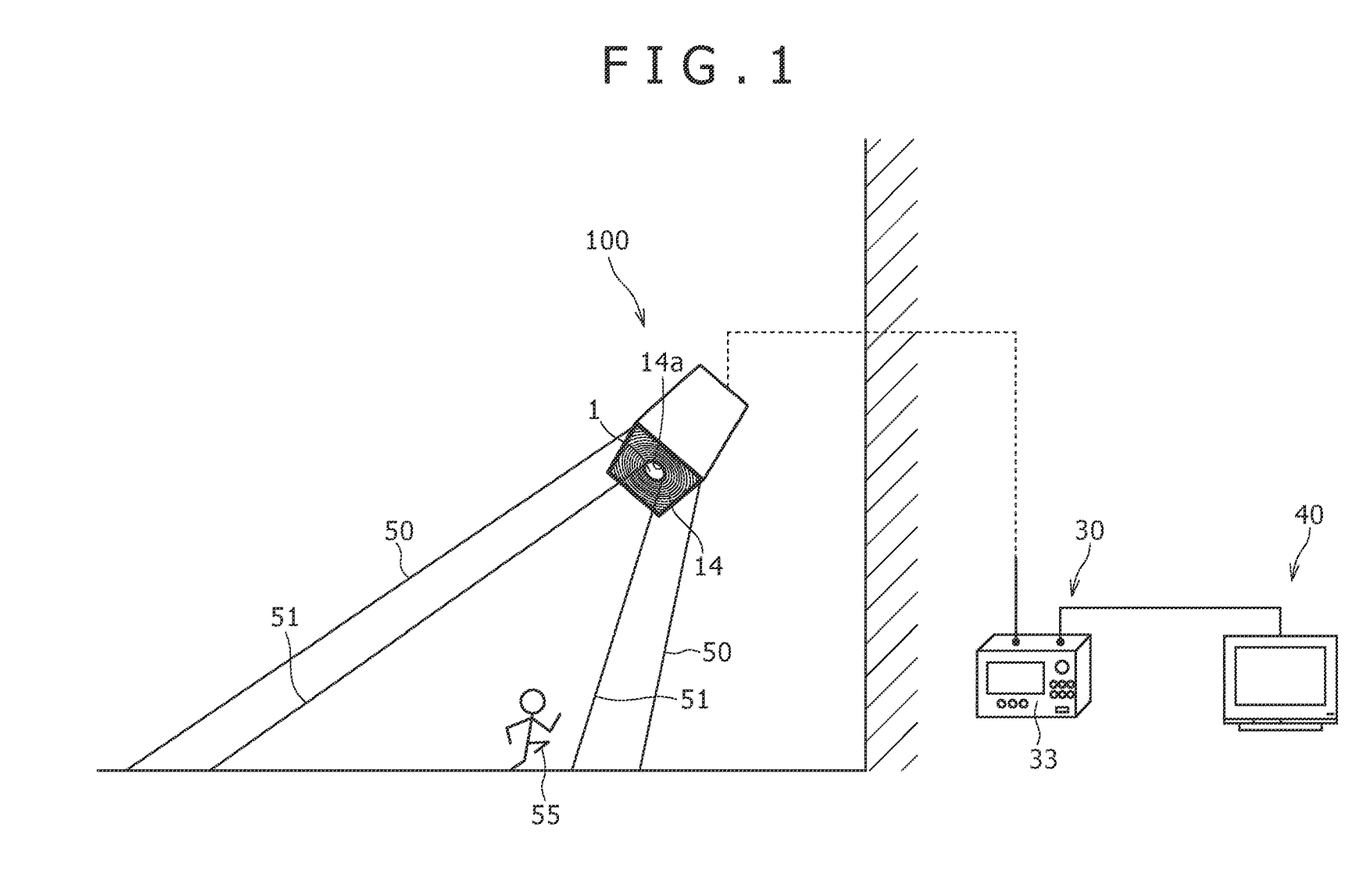
FIG. 1 is a view showing an example in which a monitoring camera according to an embodiment is installed.

External structural details of the monitoring camera according to the first embodiment will first be described below with reference to FIG. 1. FIG. 1 shows an example in which the monitoring camera according to the first embodiment is installed. In the illustrated example, the monitoring camera, denoted by 100, is substantially in the form of a rectangular parallelepiped and applies an infrared radiation to a subject to capture an image of the subject even at night. The monitoring camera 100 is mounted on an outer wall of a building. The monitoring camera 100 incorporates therein a light source including a plurality of light-emitting diodes (LEDs) for emitting an infrared radiation. The monitoring camera 100 also has a Fresnel lens 14, which is a planar lens, for emitting an infrared radiation from the light source out of the monitoring camera 100. The Fresnel lens 14 applies illuminating light (infrared radiation) from the monitoring camera 100 in a range which is substantially the same as the image capturing field angle 51 of the monitoring camera 100. The infrared radiation emitted from the light source passes through the Fresnel lens 14 and is applied in an irradiation range 50 to irradiate a subject 55. The Fresnel lens 14 has a central through hole 14a in which a camera lens 1 for capturing a subject image is disposed. The camera lens 1 includes a zoom lens with a variable image capturing field angle. Therefore, the monitoring camera 100 has a zooming function. The irradiation range 50 of the illuminating light irradiates an area which is substantially the same as the image capturing field angle 51 in which the camera lens 1 of the monitoring camera 100 captures an image.

An image captured by the monitoring camera 100 is transmitted to a central controller 30 which controls operation of the monitoring camera 100 and is recorded in the central controller 30. The central controller 30 has a video output terminal connected to a display monitor 40 for displaying images. The central controller 30 displays a captured image transmitted directly from the monitoring camera 100 on the display monitor 40 in real time, or displays recorded image data read from a hard disk drive in the central controller 30 on the display monitor 40. The central controller 30 may also display captured images supplied from a plurality of monitoring cameras 100 installed in different places, as a segmented image screen on the display monitor 40. The central controller 30 generates a control signal based on a user's action on a console panel 33 having various switches or an automatic timer setting, and transmits the generated control signal to the monitoring camera 100. Using the control signal, the central controller 30 can vary the image capturing field angle and the irradiation range 50 of the illuminating light based on the zooming function of the monitoring camera 100.

Figure 2:
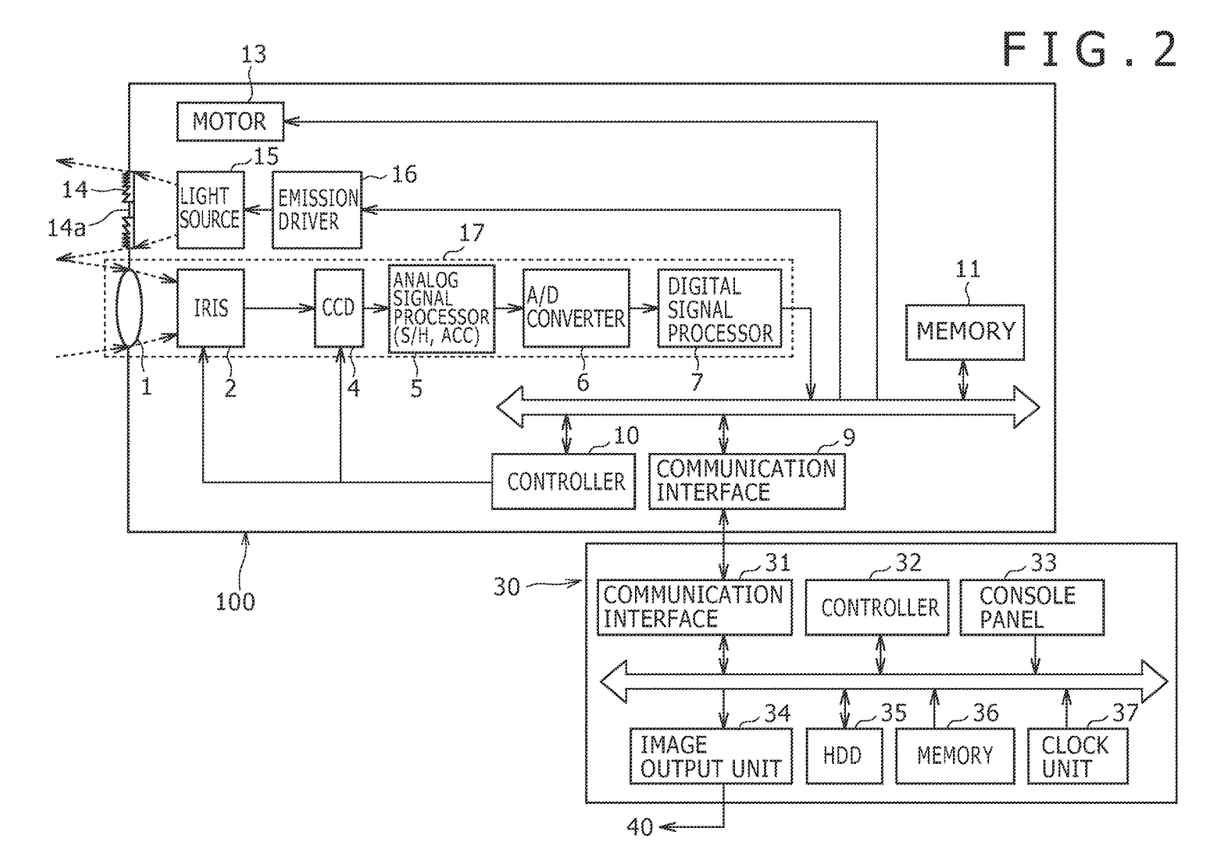
FIG. 2 is a block diagram of internal structures of the monitoring camera according to an embodiment and a central controller.

Internal structural details of the monitoring camera 100 and the central controller 30 will be described below with reference to FIG. 2. The monitoring camera 100 captures an image in an image capturing range through the camera lens 1, which includes optical components such as a plurality of zoom lenses. Incident light applied to the camera lens 1 travels through an iris 2 for aperture control and is focused onto an image capturing surface of a CCD (Charge Coupled Device) image capturing device 4. The iris 2 controls the size of an aperture for passing the incident light therethrough based on a control signal generated by a generator 10 which control various parts of the monitoring camera 100. The CCD image capturing device 4 outputs an image signal depending on a subject image focused on the image capturing surface thereof.

The image signal output from the CCD image capturing device 4 is applied to an analog signal processor 5 which performs analog signal processing on the image signal. Specifically, the analog signal processor 5 performs a sampling/holding process and an automatic gain controlling (AGC) process on the image signal, and outputs a processed analog image signal. The analog image signal is applied to an analog-to-digital (A/D) converter 6, which coverts the analog image signal into a digital image signal by sampling the analog image signal at a predetermined sampling rate. The digital image signal is then output from the A/D converter 6 to a digital signal processor 7 which performs digital signal processing on the digital image signal. Specifically, the digital signal processor 7 generates various signals required for framing, still image capturing, etc. from the digital image signal through such digital signal processing. The camera lens 1, the iris 2, the CCD image capturing device 4, the analog signal processor 5, A/D converter 6, and the digital signal processor 7 will also be collectively referred to as a camera block 17. The monitoring camera 100 has an infrared cutoff filter, not shown, that can selectively be positioned in and out of the optical path leading to the CCD image capturing device 4. For daytime monitoring, the infrared cutoff filter is placed in the optical path for the CCD image capturing device 4 to capture an image based on visible light. For nighttime monitoring, the infrared cutoff filter is placed out of the optical path for the CCD image capturing device 4 to capture an image based on an infrared radiation.

Various processing and operational sequences of the monitoring camera 100 are controlled by the controller 10.

The controller 10 reads processing programs, parameters, and data used for controlling the various parts from a writable memory 11 on an as-needed basis, performs various processing processes, and stores required parameter and data into the memory 11. The controller 10 also controls an emission driver 16 to energize a light source 15 to emit an infrared radiation.

The monitoring camera 100 incorporates therein the light source 15 for emitting an infrared radiation. The light source 15 includes a light-emitting diode array of a plurality of light-emitting diodes mounted on a board 20 (see FIG. 3) integrally combined with racks 18. An infrared radiation emitted from the light source 15 on the racks 18 is transmitted as an illuminating radiation through the Fresnel lens 14 which has an optical axis substantially in the direction along which the camera block 17 captures images. The racks 18 are held in mesh with gears operationally connected to motors 13. When the motors 13 are energized, the gears are rotated to cause the racks 18 to move the board 20 along the optical axis of the camera lens 1 to vary the irradiation range of the illuminating radiation. By thus varying the irradiation range of the illuminating radiation, the light source 15 is moved to irradiate an area which is substantially the same as the image capturing field angle of the camera block 17.

The central controller 30 has a controller 32 for controlling various parts of the central controller 30. Based on a user's action on the console panel 33 (see also FIG. 1), the controller 32 reads processing programs, parameters, and data used for controlling the various parts from a writable memory 36, and performs various processing processes. The central controller 30 has a communication interface 31 which can be connected to a communication interface 9 of the monitoring camera 100 for transmitting data to and receiving data from the monitoring camera 100. When the communication interfaces 9, 31 are connected, the central controller 30 transmits a control signal generated thereby through the communication interface 31 to the monitoring camera 100 for remotely controlling the monitoring camera 100 to perform zooming operation of the camera block 17 and adjusting the irradiation range of the illuminating radiation. The central controller 30 also receives captured images from the monitoring camera 100 through the communication interface 31.

The controller 32 adds an image capturing time to a received captured image based on time information that is read from a clock unit 37 having a timing function, and records the captured image with the added image capturing time in a hard disk drive 35 which serves as a mass storage recording medium. The controller 32 can also read times from the clock unit 37 and start and end capturing an image with the monitoring camera 100 at preset image capturing start and end times. The controller 32 records captured images in the hard disk drive 35 at successive image capturing times. The central controller 30 has an image output unit 34 for supplying captured images read from the hard disk drive 35 to the display monitor 40. The controller 32 controls the image output unit 34 to output captured images to display monitor 40 to display the captured images thereon.

Figure 3:
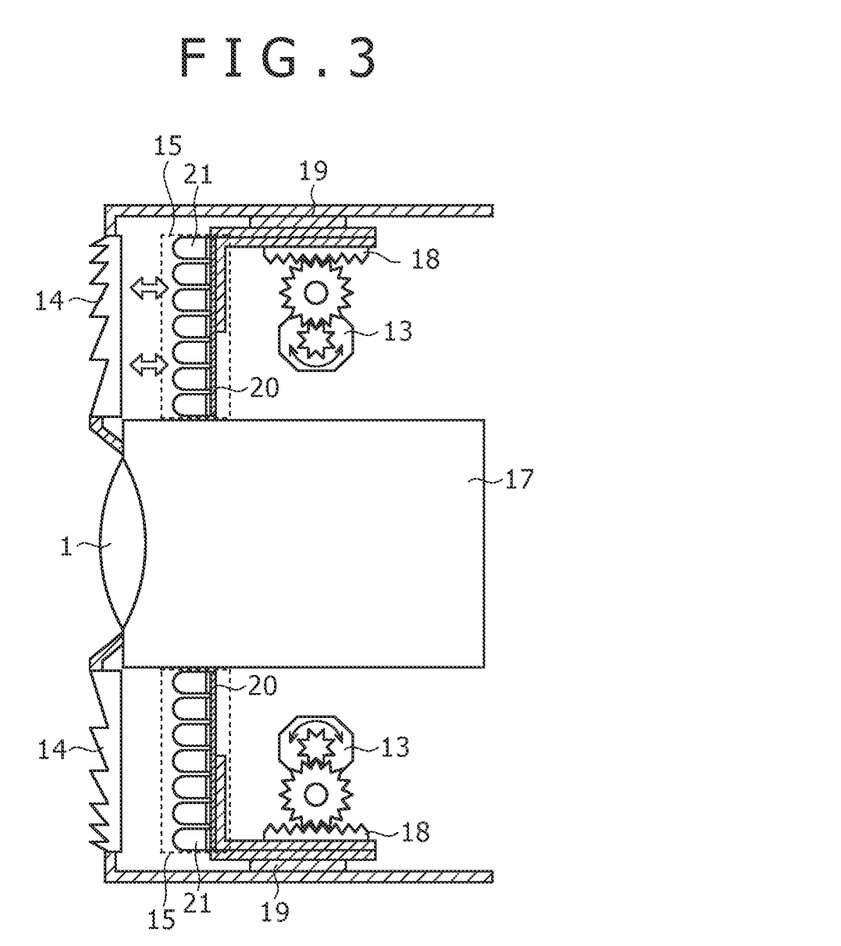
FIG. 3 is a cross-sectional view showing an example of the monitoring camera according to an embodiment.

Internal structural details of the monitoring camera 100 will further be described below with reference to FIG. 3. FIG. 3 shows the monitoring camera 100 in cross section. As shown in FIG. 3, linear guides 19 are mounted on inner wall surfaces of the housing of the monitoring camera 100 along the optical axis of the camera lens 1. The racks 18 are linearly movable on and along the linear guides 19 by a power transmitting mechanism of gears, etc. which can be actuated when the motors 13 are energized. According to the present embodiment, the light source 15 has a plurality of infrared emitting diodes 21 mounted on the board 20 which extends substantially parallel to the Fresnel lens 14. The board 20 with the infrared emitting diodes 21 mounted thereon is movable toward and away from the Fresnel lens 14 in response to energization of the motors 13. When the board 20 is thus moved, the image capturing field angle of the monitoring camera 100 varies in a range from 3° to 60° in the forward direction of the monitoring camera 100. Each of the infrared emitting diodes 21 has an irradiation angle ranging from 20° to 30°, for example. The irradiation range of the illuminating radiation is variable such that the infrared radiation emitted from the infrared emitting diodes 21 irradiates an area which is substantially the same as the image capturing field angle of the camera block 17 by passing through the Fresnel lens 14. The racks 18 are movable along the linear guides 19 by the motors 13 depending on the zoom ratio of the camera block 17. The irradiation range of the illuminating radiation is variable based on the positional relationship between the Fresnel lens 14 and the light source 15.

Figure 4A:
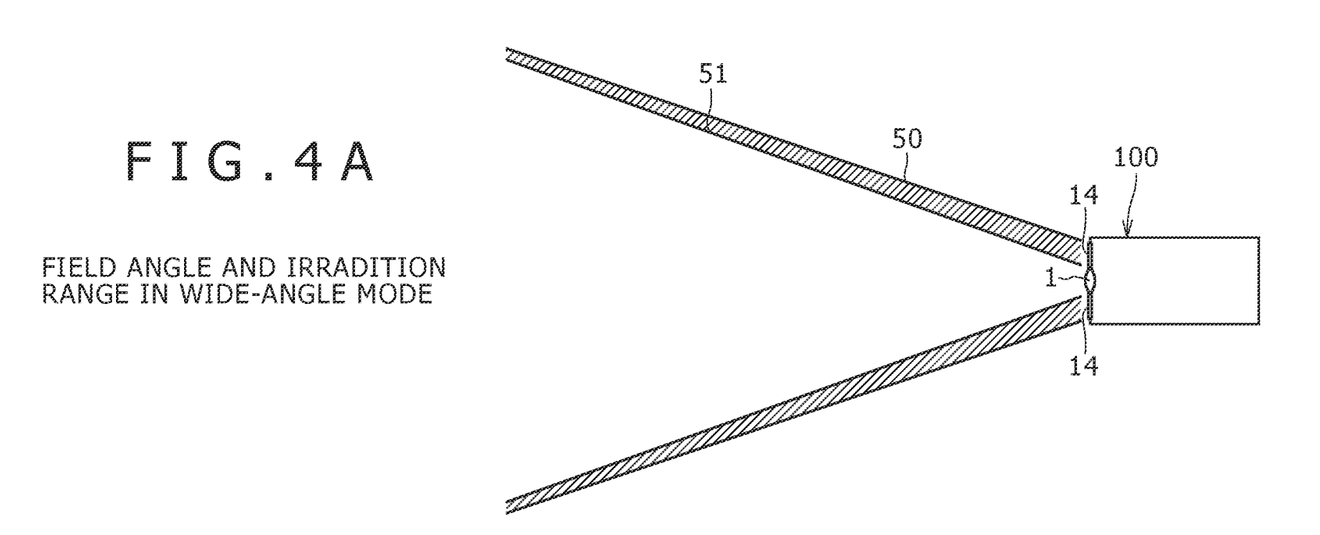
FIGS. 4A and 4B are views showing how infrared radiation application ranges and image capturing field angles of the monitoring camera according to an embodiment are ganged.
Figure 4B:
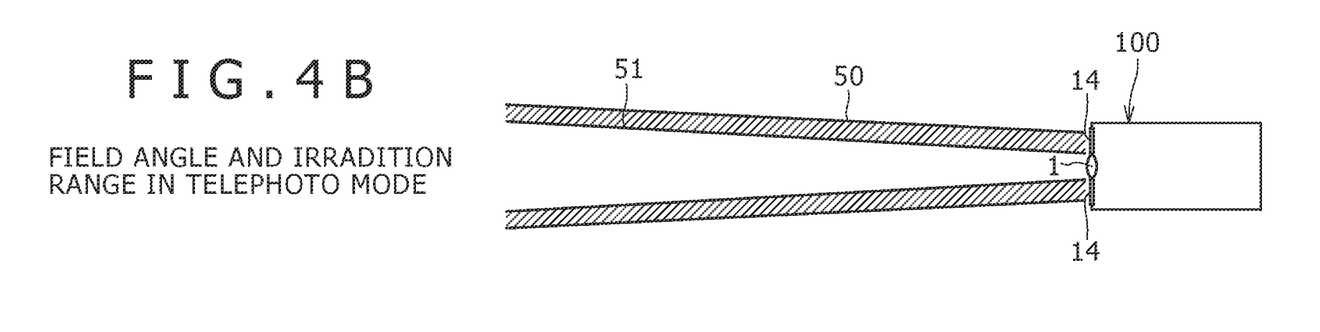

Ganged operational relationship between infrared radiation application ranges and image capturing field angles of the monitoring camera 100 will be described below with reference to FIGS. 4A and 4B. The monitoring camera 100 with the zooming function can selectively be set to a wide-angle mode and a telephoto mode. FIG. 4A shows an example of an infrared radiation application range and an image capturing field angle in the wide-angle mode, and FIG. 4B shows an example of an infrared radiation application range and an image capturing field angle in the telephoto mode. The irradiation range 50 of the monitoring camera 100 is selected to irradiate an area which is slightly greater than the image capturing field angle 51. However, since the irradiation angle of the infrared radiation is governed by the distribution characteristics of the applied illuminating radiation, the irradiation range 50 may be large enough to recognize the subject 55 when its image is to be captured even if the irradiation range 50 falls within the image capturing field angle 51.

If the image capturing field angle 51 is spread as shown in FIG. 4A, then the light source 15 is displaced toward the Fresnel lens 14 to widen the irradiation range 50 of the illuminating radiation. On the other hand, if the image capturing field angle 51 is narrowed as shown in FIG. 4B, then the light source 15 is displaced away from the Fresnel lens 14 to narrow the irradiation range 50 of the illuminating radiation. Therefore, the irradiation range 50 of the illuminating radiation is variable in ganged relation to the zooming action of the camera lens 1 to change the image capturing field angle 51.

Accordingly, it is possible to vary the irradiation range 50 of the illuminating radiation so as to irradiate an area which is substantially the same as the image capturing field angle 51 of the monitoring camera 100, for capturing an image of the subject 55.

According to the present embodiment, the monitoring camera 100 is capable of varying the irradiation range 50 of the illuminating radiation substantially in the same manner as with the image capturing field angle 51 which varies as the camera block 17 makes a zooming action between the telephoto mode and the wide-angle mode. As a result, the monitoring camera 100 can apply an appropriate amount of infrared radiation depending on the position and size of the subject 55 to be imaged. The monitoring camera 100 can reliably capture an image of the subject 55 without an illuminating radiation shortage even when the subject 55 is located far away from the monitoring camera 100.

Figure 5:
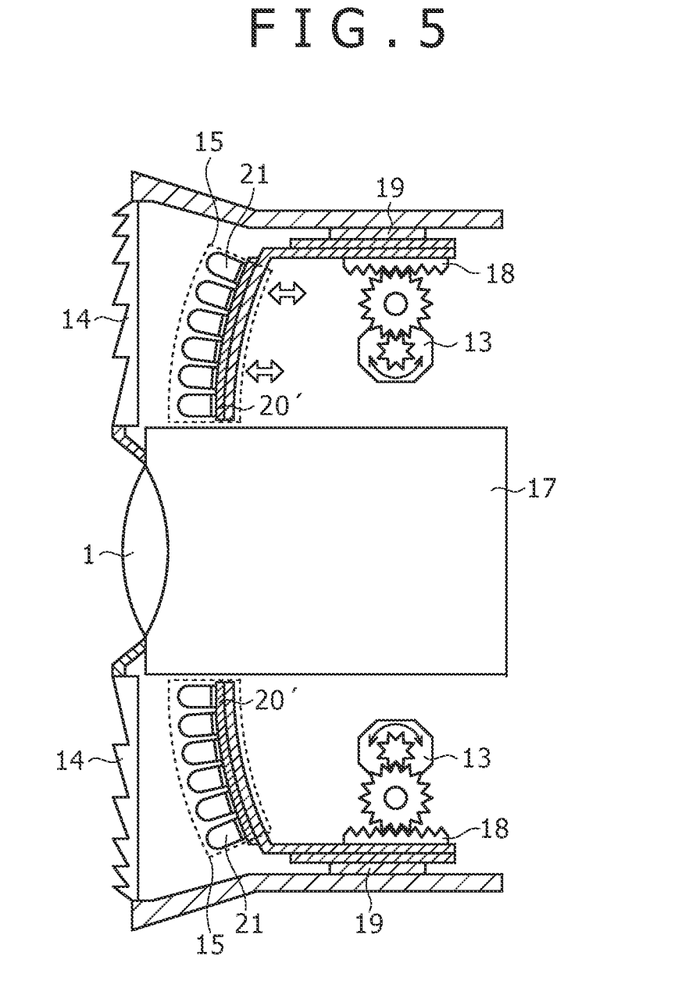
FIG. 5 is a cross-sectional view showing another example of the monitoring camera according to an embodiment.

In the first embodiment described above, an infrared radiation is emitted from the infrared emitting diodes 21 mounted on the planar board 20. However, as shown in FIG. 5, an infrared radiation may be emitted from a plurality of infrared emitting diodes 21 mounted on a curved board 20' which is convex outwardly, i.e., toward the Fresnel lens 14. Details of the monitoring camera shown in FIG. 5, other than the curved board 20', are identical to those of the monitoring camera 100 shown in FIG. 3. Since the light source has its radiation distribution characteristics changed by changing the layout of the infrared emitting diodes, the distribution characteristics of the applied illuminating radiation can be changed for a wider irradiation range.

A monitoring camera 200 according to a second embodiment will be described below with reference to FIGS. 6A, 6B, 7, and 8. The monitoring camera 200 is capable of varying the irradiation range of the illuminating radiation by changing light source energization patterns.

First, internal structural details of the monitoring camera 200 will be described below. The monitoring camera 200 has a light source 24 for emitting an infrared radiation, the light source 24 including a total of nine infrared emitting diodes 21a through 21i arranged in three vertical columns and three horizontal rows and mounted on the board 20. The monitoring camera 200 also has a microlens array 22 disposed in front of the board 20 for converting infrared radiations emitted from the respective infrared emitting diodes 21a through 21i into a parallel beam, and a projector optical system lens 23 disposed in front of the microlens array 22 for enlarging the irradiation range of the illuminating radiation from the microlens array 22. The monitoring camera 200 has a signal processing system which is identical to the signal processing system of the monitoring camera 100 according to the first embodiment shown in FIG. 2. The monitoring camera 200 differs from the monitoring camera 100 in that the controller 10 controls light source energization patterns peculiar to the second embodiment.

Examples of light source energization patterns of the monitoring camera 200 will be described below. When the monitoring camera 200 detects a moving subject 55, the monitoring camera 200 changes energization patterns of the light source 24 to follow the subject to apply the illuminating radiation to the subject or intermittently energizes the light source 24 at given emission intervals to apply the illuminating radiation to the subject. These functions of the monitoring camera 20 are achieved under the control of the controller 10 which operates according to control commands from the central controller 30. When the monitoring camera 200 detects a moving subject 55, the controller 10 can also individually energize the infrared emitting diodes 21a through 20i according to full or partial energization patterns read from the memory 11.

Figure 6A:
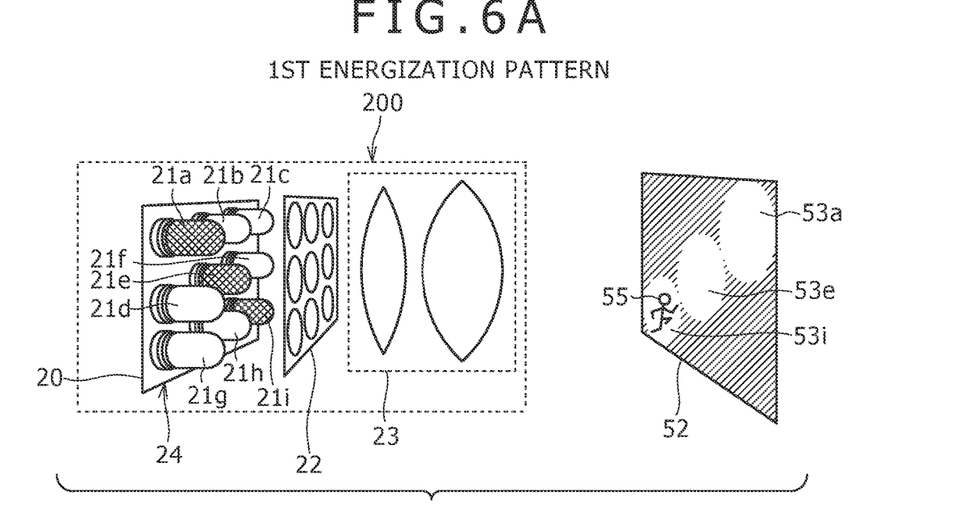
FIGS. 6A and 6B are views showing examples of different light source energization patterns for achieving different irradiated states with a monitoring camera according to a second embodiment.

FIG. 6A shows a first light source energization pattern by way of example. According to the first light source energization pattern, a diagonal array of infrared emitting diodes on the board 20 are energized. Specifically, when the monitoring camera 200 detects the moving subject 55 which moves diagonally as shown in FIG. 6A, the controller 10 energizes the infrared emitting diodes 21a, 21e, 21i and de-energizes the other infrared emitting diodes. Infrared radiations emitted from the infrared emitting diodes 21a, 21e, 21i pass through the microlens array 22 and the optical system lens 23, and illuminate irradiated areas 53a, 53e, 53i on a diagonal line of a captured image 52.

Figure 6B:
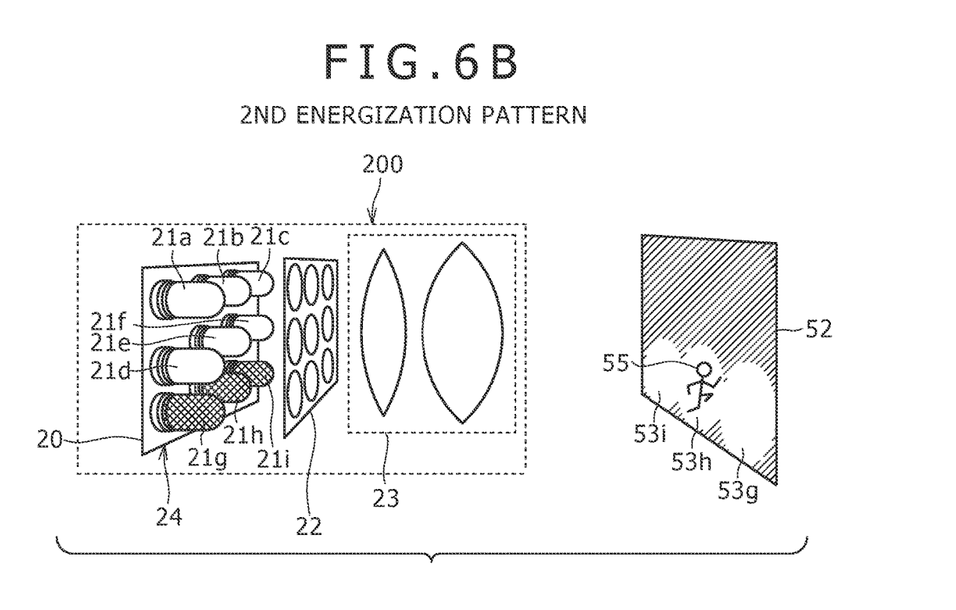

FIG. 6B shows a second light source energization pattern by way of example. According to the second light source energization pattern, a lower array of infrared emitting diodes on the board 20 are energized. Specifically, when the monitoring camera 200 detects the moving subject 55 which moves horizontally, as shown in FIG. 6B, the controller 10 energizes the infrared emitting diodes 21g, 21h, 21i and de-energizes the other infrared emitting diodes for following the subject 55. Infrared radiations emitted from the infrared emitting diodes 21g, 21h, 21i pass through the microlens array 22 and the optical system lens 23, and illuminate irradiated areas 53g, 53h, 53i on a lower horizontal line of the captured image 52.

In FIGS. 6A and 6B, three infrared emitting diodes are simultaneously energized. However, only one or two infrared emitting diodes may be simultaneously energized.

Figure 7:
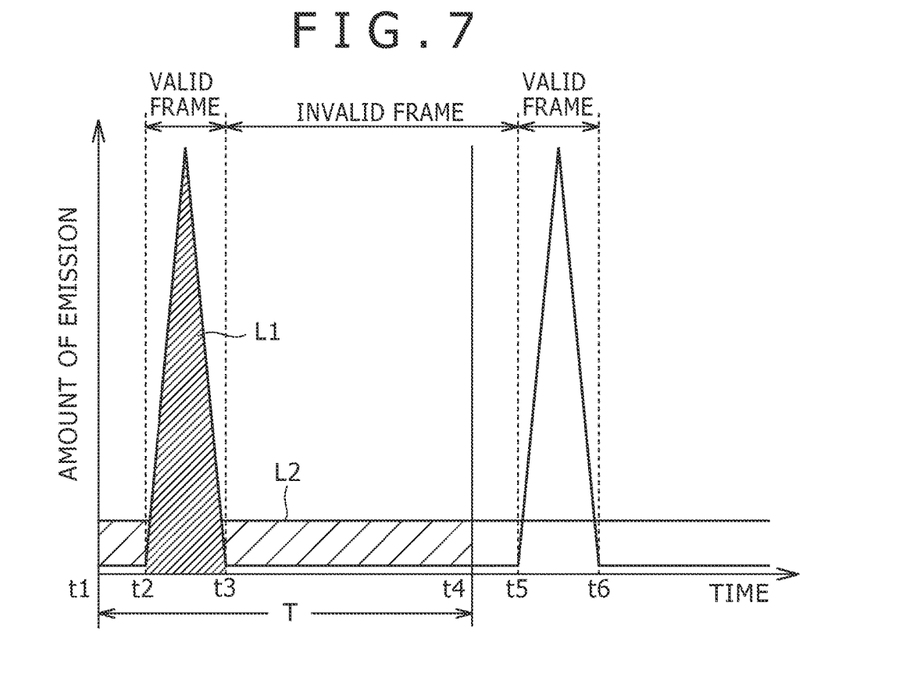
FIG. 7 is a graph showing an example of intermittent irradiation only in valid frames according to the second embodiment.

In the second embodiment shown in FIGS. 6A and 6B, the light source energization patterns are controlled. These light source energization patterns may be combined with an intermittent light source energization pattern to be described below for more efficient generation of illuminating radiation. An example of intermittent infrared irradiation only in valid frames according to the second embodiment will be described below with reference to FIG. 7. FIG. 7 shows a graph having a horizontal axis representing time and a vertical axis the level of emitted infrared radiation. In this example, the monitoring camera 200 has its infrared emitting diodes not continuously energized, but intermittently energized in synchronism with an image capturing timing interval of the camera block 17.

A traditional monitoring camera has its infrared emitting diodes continuously energized for monitoring. In FIG. 7, the traditional monitoring camera emits a level L2 of infrared radiation continuously for times t1 through t4 from the infrared emitting diodes. The monitoring camera 200 according to the present embodiment shown in FIG. 7 has its infrared emitting diodes energized for strobe emission for a strobe emission period T=t4-t1 in synchronism with an image capturing timing interval. An image capturing timing interval from time t2 to time t3 represents a valid frame, and a timing interval from time t3 to time t5 represents an invalid frame. Time t5-t4 is equal to time t2-t1. The monitoring camera 200 emits a level L1 of infrared radiation intermittently for times t2 through t3 from the infrared emitting diodes. If the amount of emission energy produced by the level L1 of infrared radiation for times t2 through t3 is equal to the amount of emission energy produced by the level L2 of infrared radiation from times t1 through t4, then the infrared emitting diodes can emit a stronger level of infrared radiation in synchronism with the image capturing timing interval to give a far subject an amount of infrared radiation required to capture an image of the subject.

Figure 8:
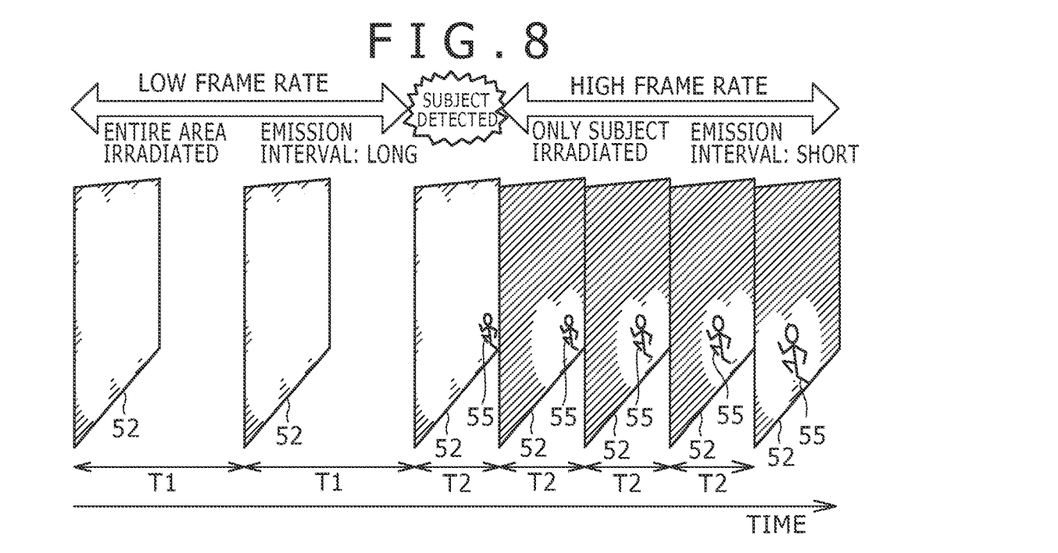
FIG. 8 is a diagram showing an example of an irradiated area required to capture an image according to the second embodiment.

An example in which only an area required to capture an image is irradiated in synchronism with the image capturing timing interval will be described below with reference to FIG. 8. FIG. 8 shows a diagram having a horizontal axis representing time with an array of captured images 52 arranged at respective times. The monitoring camera 200 according to the present embodiment shown in FIG. 8 has its infrared emitting diodes energized for strobe emission in synchronism with an image capturing timing interval of the camera block 17, and also changes energization patterns of the infrared emitting diodes in order to follow a moving subject. Specifically, the monitoring camera 200 controls the light source 24 to emit an infrared radiation at intervals T1 (in sec.) according to a pattern or to emit an infrared radiation at intervals T2 (in sec.) according to another pattern wherein the intervals T1 are longer than the intervals T2 (T1>T2). Similarly, the monitoring camera 200 controls the camera block 17 to capture images at image capturing timing intervals T1 (in sec.) or to capture images at image capturing timing intervals T2 (in sec.) wherein the intervals T1 are longer than the intervals T2 (T1>T2). If there is no moving subject 55 detected in captured images 52 output from the camera block 17, then the monitoring camera 200 controls the light source 24 to emit an infrared radiation at the intervals T1. The controller 10 selects a lower frame rate for increased infrared radiation emission intervals, and applies the illuminating radiation to the entire image capturing range. If there is a moving subject 55 detected in captured images 52 output from the camera block 17, then the monitoring camera 200 controls the light source 24 to emit an infrared radiation at the intervals T2 and also controls the camera block 17 to capture images at image capturing timing intervals T2. The controller 10 selects a higher frame rate for reduced infrared radiation emission intervals, and applies the illuminating radiation to a portion, which includes the subject 55, of the entire image capturing range to change light source energization patterns in order to follow the moving subject 55. Each of the intervals T1 may be 1 second, and each of the intervals T2 may be ⅓₀ second.

In this manner, the monitoring camera 200 is capable of capturing images by changing image capturing timing intervals and light source energization patterns.

According to the second embodiment, when the light source is energized intermittently, the electric power consumption is reduced and the amount of heat generated by the monitoring camera is also reduced. However, the light source can apply an intensive illuminating radiation in synchronism with the image capturing timing intervals of the camera block. As a result, the monitoring camera achieves a sufficient level of illuminance at positions for the monitoring camera to make captured images highly bright, and can capture images positioned at greater distances from the monitoring camera at night. When a subject is detected, the image capturing timing intervals are shortened to capture images of the subject at a higher frame rate. Consequently, images of the subject can reliably be captured even if the subject moves quickly. Since the light source includes infrared emitting diodes, it can switch instantaneously between the energized state and the de-energized state, allowing images of the subject to be captured depending on the motion of the subject.

When the image capturing range is monitored ordinarily with no subject detected, its image is captured at a lower frame rate. Even if the image capturing range is monitored for a long period of time, therefore, the amount of data of captured images to be recorded may be small. Accordingly, the required amount of data may be recorded in a recording device such as a hard disk drive, a tape drive, or the like for an increased period of time. If images are recorded in a tape drive, then the tape in the tape drive may be replaced less frequently.

In FIGS. 6A and 6B, a diagonal array of infrared emitting diodes and a low array of infrared emitting diodes, respectively, are energized simultaneously. However, the infrared emitting diodes to be energized are not limited to the patterns shown in FIGS. 6A and 6B. If a plurality of subjects 55 are detected at opposite ends of the image capturing range 52, the emitted infrared radiation may be applied to the subjects 55 only. In this manner, the electric power consumption of the light source is further reduced, and the freedom with which to switch between irradiation ranges is increased.

In FIGS. 6A and 6B, the light source includes a total of nine infrared emitting diodes 21a through 21i arranged in three vertical columns and three horizontal rows. However, the number of infrared emitting diodes that can be used is not limited to nine, but the light source may include more or less infrared emitting diodes depending on the circumstances in which the monitoring camera is used.

In FIG. 7, the amount of emission energy produced by the level L1 of infrared radiation for times t2 through t3 is equal to the amount of emission energy produced by the level L2 of infrared radiation from times t1 through t4. However, there is a situation where a high level of infrared radiation may not be required when the image capturing range is monitored ordinarily with no subject detected. In such a situation, the infrared radiation emission intervals may be increased to reduce the amount of emission energy produced by the level L1 of infrared radiation for times t2 through t3, for thereby lowering the electric power consumption. If the monitoring camera is powered by a limited power supply such as a battery or the like, then the increased infrared radiation emission intervals are effective to prolong the service life of the battery.

A monitoring camera 300 according to a third embodiment will be described below with reference to FIGS. 9 through 12. The monitoring camera 300 employs a light guide in the form of optical fibers to increase the freedom with which to position a light source. The monitoring camera 300 has a signal processing system which is identical to the signal processing system of the monitoring camera 100 according to the first embodiment shown in FIG. 2. The monitoring camera 300 differs from the monitoring camera 100 in that it has a light source peculiar to the third embodiment.

Figure 9:
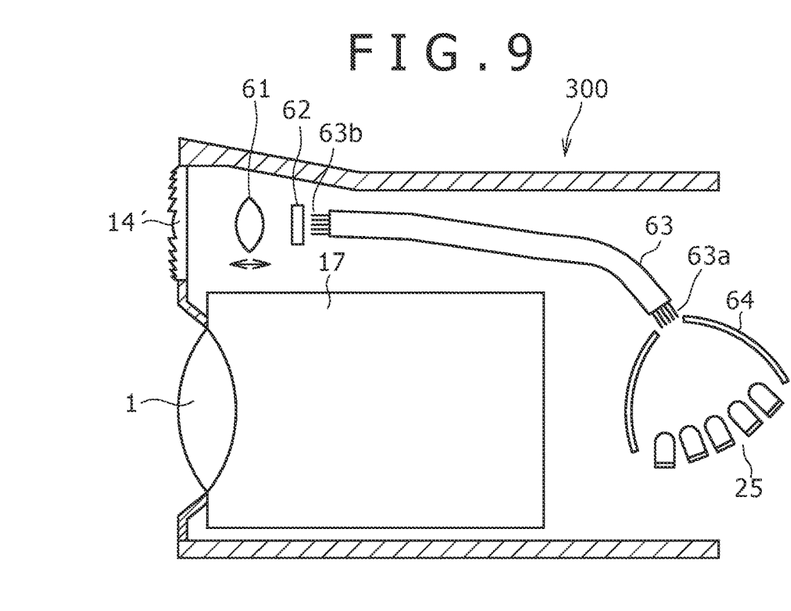
FIG. 9 is a cross-sectional view showing an example of a monitoring camera according to a third embodiment, which employs optical fibers to increase the freedom with which to position a light source.

First, internal structural details of the monitoring camera 300 will be described below. FIG. 9 shows in cross section the monitoring camera 300 which employs optical fibers 63 for guiding a infrared radiation from infrared emitting diodes of a light source 25 to a Fresnel lens 14'. Specifically, the infrared radiation from the infrared emitting diodes of the light source 25 is collected by a reflector 64 having a circularly curved inner reflecting surface toward a first terminal end 63a of the optical fibers 63. The optical fibers 63 are capable of transmitting the infrared radiation applied to the first terminal end 63a therethrough to a second terminal end 63b, opposite to the first terminal end 63a, and emitting the transmitted infrared radiation from the second terminal end 63b without any substantial loss. The infrared radiation applied to the first terminal end 63a passes through the optical fibers 63 and is emitted from the second terminal end 63b. The emitted infrared radiation is converted from a converged beam into a spread beam by a diffusion plate 62. The infrared radiation emitted from the diffusion plate 62 passes a zoom lens 61 and the Fresnel lens 14', and is applied to the image capturing range of the monitoring camera 300. Although the light source 15 according to the first embodiment is movable, the light source 25 of the third embodiment is not movable, but the zoom lens 61 is movable to enlarge or contract the infrared radiation beam emitted from the second terminal end 63b of the optical fibers 63 before the infrared radiation passes through the Fresnel lens 14 and is applied as the illuminating radiation to the image capturing range.

According to the third embodiment, the light source 25 of the illuminating radiation may be located at a position spaced from the monitoring camera 300.

For example, the optical fibers 63 allow the light source 25 to be spaced from the Fresnel lens 14' of the monitoring camera 300. Therefore, as shown in FIG. 9, the light source 25 may be disposed behind the camera block 17 in the housing of the monitoring camera 300. Therefore, the monitoring camera 300 itself may be reduced in size. Alternatively, the light source 25 may not be placed in the housing of the monitoring camera 300, but may be located outside of the housing of the monitoring camera 300 to transmit the infrared radiation through the optical fibers 63 into the monitoring camera 300. The alternative arrangement makes it possible to further reduce the size of the monitoring camera 300.

Figure 10:
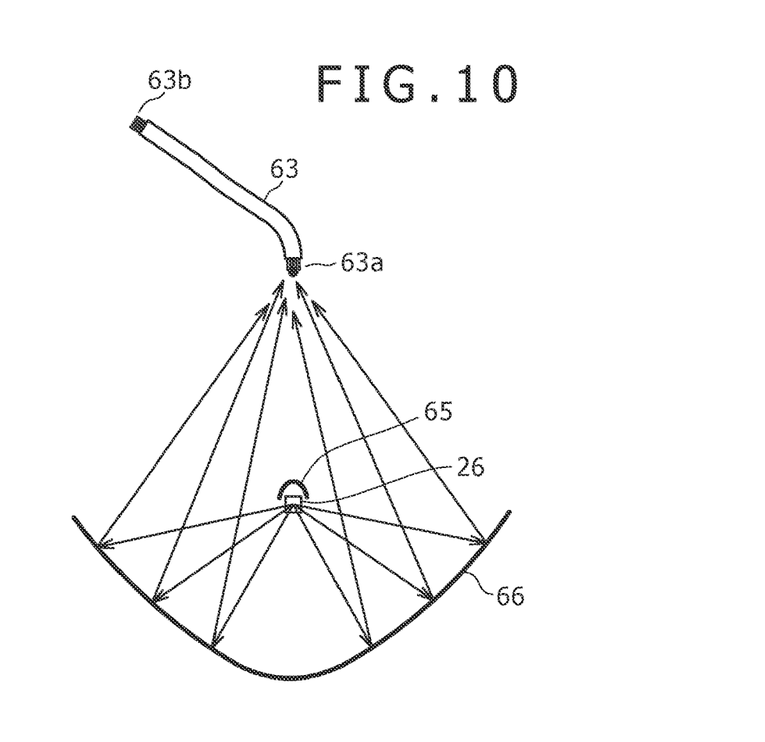
FIG. 10 is a cross-sectional view showing another example of the monitoring camera according to the third embodiment, which employs reflecting mirrors to collect light for the optical fibers.
Figure 11:
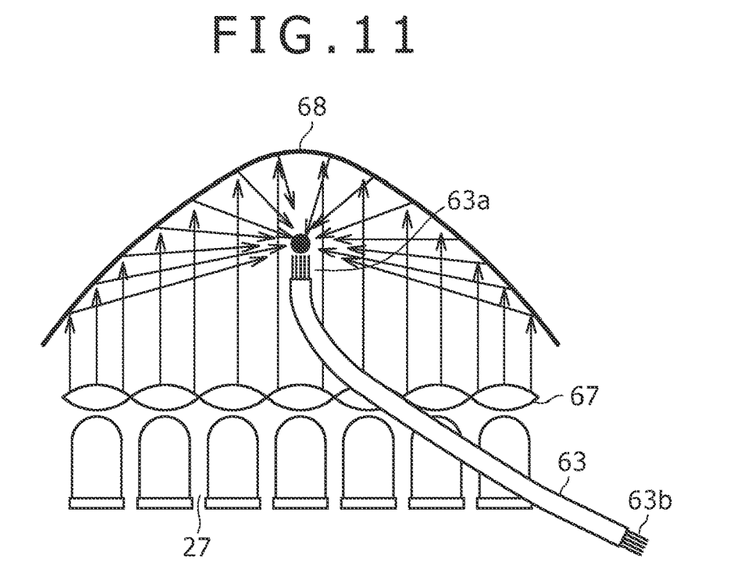
FIG. 11 is a cross-sectional view showing still another example of the monitoring camera according to the third embodiment, which employs a multireflector and a lens array to collect light for the optical fibers.
Figure 12:
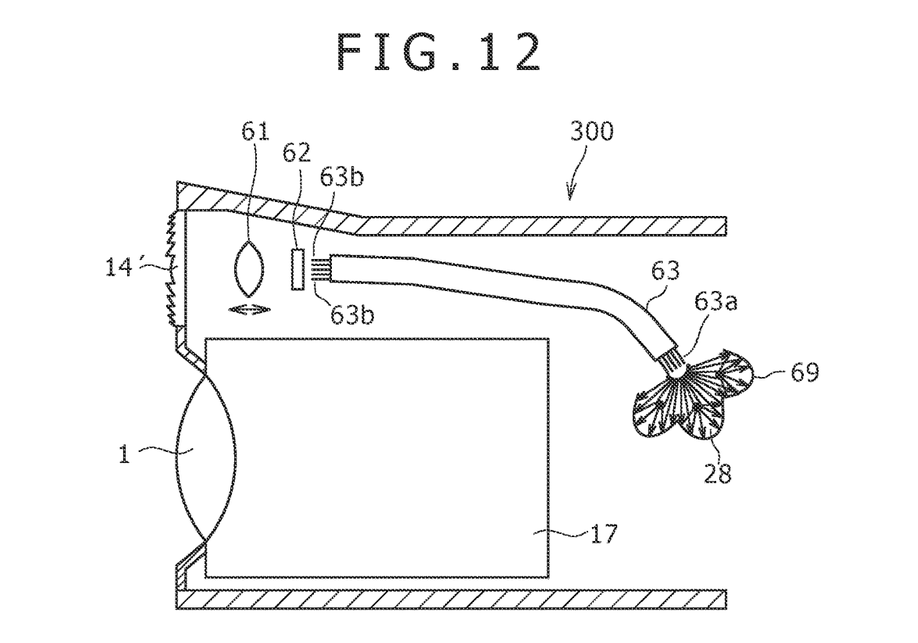
FIG. 12 is a cross-sectional view showing yet another example of the monitoring camera according to the third embodiment, which employs a condensing light source.

In the third embodiment, the infrared radiation from the light source 25 is collected by the reflector 64. However, the infrared radiation from the light source 25 may be guided to the optical fibers 63 by any of various other structures. FIGS. 10 through 12 show such other structures for guiding or collecting the infrared radiation from the light source toward the optical fibers 63.

FIG. 10 shows a structure in which the infrared radiation emitted from the light source is collected by two reflecting mirrors that confront each other. The light source includes an infrared emitting diode chip 26. The infrared radiation emitted from the infrared emitting diode chip 26 is reflected by a concave reflecting mirror 66 and focused to a position at the focal point of the reflecting mirror 66. The first terminal end 63a of the optical fibers 63 is disposed near the focal point of the reflecting mirror 66. Another smaller-diameter concave reflecting mirror 65 is positioned near the infrared emitting diode chip 26 in confronting relation to the reflecting mirror 66 for directing the infrared radiation emitted from the infrared emitting diode chip 26 toward the reflecting mirror 66. With the arrangement shown in FIG. 10, the infrared radiation emitted from the infrared emitting diode chip 26 is collected by the reflecting mirrors 65, 66 toward the first terminal end 63a of the optical fibers 63. The collected infrared radiation is transmitted through the optical fibers 63 and then emitted from the second terminal end 63b.

FIG. 11 shows a structure in which the infrared radiation emitted from a light source 27 is collected by a multireflector. Specifically, a microlens array 67 for producing parallel beams is disposed in front of a plurality of infrared emitting diodes of the light source 27. The infrared radiation emitted from the light source 27 is converted by the microlens array 67 into parallel beams, which are reflected by a concave multireflector 68 and focused onto the first terminal end 63a of the optical fibers 63. The infrared radiation beam applied to the first terminal end 63a travels through the optical fibers 63 and then is emitted from the second terminal end 63b.

FIG. 12 shows a structure in which the infrared radiation emitted from a plurality of light sources. Specifically, concave reflectors 69 are disposed respectively around light sources 28 and have respective focal points positioned at the first terminal end 63a of the optical fibers 63. The infrared radiation emitted from the light sources 28 are reflected by the respective reflectors 69 and focused onto the first terminal end 63a of the optical fibers 63. The infrared radiation beam applied to the first terminal end 63a travels through the optical fibers 63 and then is emitted from the second terminal end 63b.

In the third embodiment described above, the optical fibers 63 are used as a light guide. However, any of various other members capable of emitting a radiation applied to one end thereof from the other end thereof may be employed as a light guide.

According to the first through third embodiments described above, since the monitoring camera can employ various different light sources and emission patterns, a effective illuminating radiation can be applied to a subject positioned in the image capturing range to capture an image of the subject. Images of subjects, which have heretofore been difficult to capture at night unless a combination of a large-size projector and a large-size motor-driven camera platform are used, can be captured by a single monitoring camera combined with a small-size light source. According to an embodiment, the monitoring camera can be installed in a reduced installation space at a reduced installation cost. The image capturing field angle and the irradiation range of the monitoring camera can freely be controlled in a ganged fashion. Inasmuch as the infrared radiation emitted from the light source can be efficiently guided to a position near the camera block, the light source may be reduced in size. The light source in the form of light-emitting diodes is capable of emitting a required amount of radiation even though it consumes a small amount of electric power, and hence may be of a low electric power requirement.

In the first through third embodiments described above, the light source includes infrared emitting diodes. However, the light source may include light-emitting diodes for emitting visible light. Alternatively, infrared emitting diodes and light-emitting diodes may be combined with each other and may alternatively be energized to selectively emit an infrared radiation and visible light. White-light-emitting diodes are easy and convenient to use because they are less liable to deteriorate even when used over a long period of time and are highly durable when instantaneously energized. The light source for emitting visible light may include a halogen lamp, a fluorescent tube, or the like.

The arrangement for varying the irradiation angle depending on the image capturing field angle, the arrangement for changing light source energization patterns to intermittently energize the light source, and the arrangement for guiding the infrared radiation through the light guide, as described above according to the first through third embodiments, may be combined in any of various possible combinations.

The recording device incorporated in the central controller 30 includes the hard disk drive 35 in the illustrated embodiment. However, captured images may be recorded in any of various recording mediums including an optical disk, a magnetic disk, a magneto-optical disk, a flash memory, at the like.

Figure 13A:
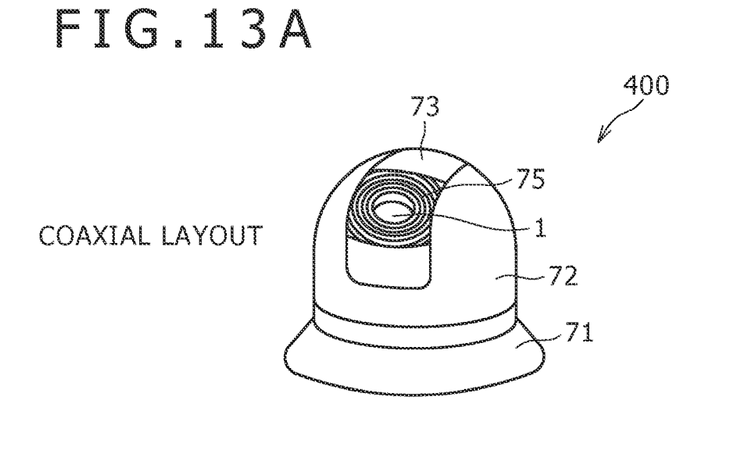
FIGS. 13A, 13B, and 13C are perspective views of monitoring cameras according to other embodiments.
Figure 13B:
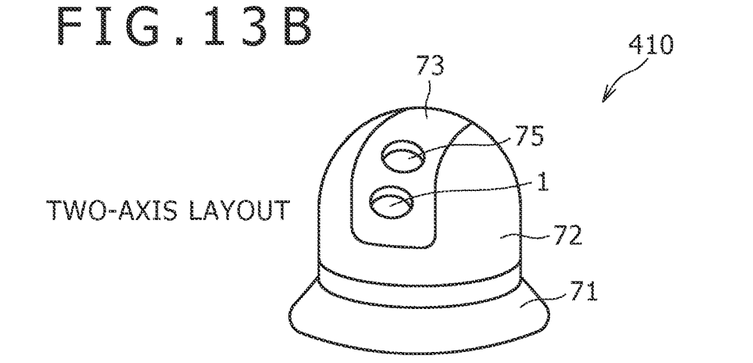
Figure 13C:
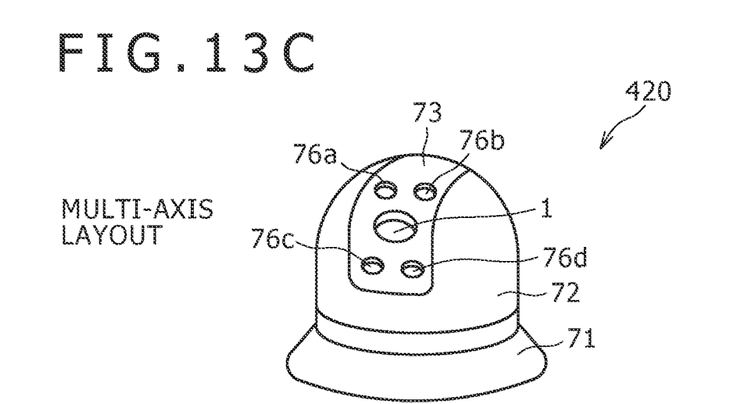

In the first through third embodiments described above, the light source and the camera block are accommodated in the monitoring camera housing in the form of a rectangular parallelepiped. However, the monitoring camera may have a housing having another shape. FIGS. 13A through 13C show motor-driven swingable PTZ (Pan-Tilt-Zoom) monitoring cameras having an infrared emitter for emitting an infrared radiation from a light source incorporated therein. Each of the motor-driven swingable PTZ monitoring cameras shown in FIGS. 13A through 13C includes a dome-shaped camera having a camera block and a projector, and can be rotated about vertical and horizontal axes (not shown).

Specifically, FIG. 13A shows a monitoring camera 400 having a camera lens and an infrared emitter whose respective axes are aligned with each other. Specifically, the monitoring camera 400 is fixedly mounted on a base 71. The monitoring camera 400 includes a horizontally movable unit 72 disposed on the base 71 for rotation through horizontal angles and a vertically movable unit 73 disposed in the horizontally movable unit 72 for rotation through vertical angles. The vertically movable unit 73 houses therein an infrared emitter 75 having a Fresnel lens and a camera lens 1 coaxial with the infrared emitter 75.

FIG. 13B shows a monitoring camera 410 having a camera lens and an infrared emitter whose respective axes are spaced from and extend parallel to each other. Specifically, the monitoring camera 410 is fixedly mounted on the base 71. The monitoring camera 410 includes the horizontally movable unit 72 disposed on the base 71 and the vertically movable unit 73 disposed in the horizontally movable unit 72. The vertically movable unit 73 houses therein the infrared emitter 75 and the camera lens 1 whose respective axes are spaced from and extend parallel to each other.

FIG. 13C shows a monitoring camera 420 having a camera lens and four infrared emitters, the infrared emitters having respective axes disposed around the camera lens. Specifically, the monitoring camera 420 is fixedly mounted on the base 71. The monitoring camera 420 includes the horizontally movable unit 72 disposed on the base 71 and the vertically movable unit 73 disposed in the horizontally movable unit 72. The vertically movable unit 73 houses therein the camera lens 1 and four infrared emitters 76a through 76d which are disposed around the camera lens 1. The infrared emitters 76a through 76d have respective axes parallel to the optical axis of the camera lens 1.

The monitoring cameras 400, 410, 420 may be electrically connected to a central controller for setting swinging angles and swinging patterns to vary an image capturing range and adjust an irradiation angle depending on a camera zooming action. The motor-driven swingable monitoring cameras with the projector incorporated in their head are thus capable of providing a sufficient distance over which the radiation is to be projected and a sufficient level of illuminance over the distance, for thereby achieving an increased monitoring capability.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A monitoring camera for a surveillance system comprising:
    a horizontally movable unit for rotation through horizontal angles, the horizontally movable unit disposed on a base;
    a vertically movable unit disposed in the horizontally movable unit for rotation through vertical angles, wherein the vertically movable unit includes:
    an image capturing unit configured to capture an image of a subject therein, said image capturing unit having a zooming function,
    a curved board with a plurality of light sources including a first light source configured to emit illuminating radiation and a second light source configured to emit illuminating radiation,
    a motor configured to change a position of the curved board,
    a lens unit configured to apply said illuminating radiation in a direction which is substantially identical to a direction in which said image capturing unit captures the image, and
    an irradiation control unit configured to control the motor to variably set, while zooming, an irradiation angle of said illuminating radiation to irradiate an area,
    wherein the irradiation angle is set based on the position of the curved board, and the position of the curved board is changed depending on a zoom ratio of the image capturing unit,
    wherein the area as irradiated by the first and second light sources is larger than a captured area by the image capturing unit, and
    wherein an optic axis of the first light source and an optic axis of the second light source are parallel to an optic axis of the image capturing unit; and
    the monitoring camera further comprising a communication interface configured to transmit the captured image to a remote site.

2. The monitoring camera according to claim 1, wherein the irradiation control unit is configured to mechanically move the first and second light sources in ganged relation with a zoom lens shifting at least one of towards and away from an end of a camera lens.

3. The monitoring camera according to claim 1, wherein the first and second light sources each have a light guide configured to guide the illuminating radiation from a light emitting diode to said lens unit.

4. The monitoring camera according to claim 1, wherein the first and second light sources each include one or more light emitting diodes.

5. The monitoring camera according to claim 4, wherein the one or more light emitting diodes are infrared light emitting diodes configured to emit an infrared radiation.

6. The monitoring camera according to claim 1, wherein the lens unit is a Fresnel lens.

7. The monitoring camera according to claim 1, wherein lens unit remains still while the first and second light sources move towards and away from the through hole in the lens unit.

8. The monitoring camera according to claim 1, wherein the first and second light sources are disposed adjacent to the image capturing unit.

9. The monitoring camera according to claim 1, wherein the first and second light sources are disposed around the image capturing unit.

10. The monitoring camera according to claim 1, wherein the monitoring camera has a pan function and tilt function.

11. The monitoring camera according to claim 1, wherein the first and second light sources each have a plurality of light emission diodes and a lighting pattern of the first and second light sources is changeable.

12. The monitoring camera according to claim 1, wherein the imaging capturing unit has an image capturing field angle adjustable by a zooming optical system, which includes a camera lens with a zoom lens configured to shift at least one of toward and away from an end of the camera lens.

13. The monitoring camera according to claim 1,
    wherein the irradiation control unit is configured to control the first and second light sources,
    wherein the control unit is configured to control the first and second light sources to emit an illuminating radiation in a first lighting pattern mode if no subject is detected in the image captured by the image capturing unit,
    wherein the control unit is configured to control the first and second light sources to emit an illuminating radiation in a second lighting pattern mode if a subject is detected in the image captured by the image capturing unit, wherein a range of the illuminating radiation in the first lighting pattern mode is different from a range of the illuminating radiation in the second lighting pattern mode, and wherein the illuminating radiation in the second lighting pattern mode is changed based on moving of the subject.

14. A surveillance system, comprising;

a monitoring camera;

wherein the monitoring camera includes:

a horizontally movable unit for rotation through horizontal angles, the horizontally movable unit disposed on a base;

a vertically movable unit disposed in the horizontally movable unit for rotation through vertical angles, wherein the vertically movable unit includes:

an image capturing unit configured to capture an image of a subject therein, said image capturing unit having a zooming function, a curved board with a plurality of light sources including a first light source configured to emit illuminating radiation and a second light source configured to emit illuminating radiation, a motor configured to change a position of the curved board, a lens unit configured to apply said illuminating radiation in a direction which is substantially identical to a direction in which said image capturing unit captures the image, and an irradiation control unit configured to control the motor to variably set, while zooming, an irradiation angle of said illuminating radiation to irradiate an area, wherein the irradiation angle is set based on the position of the curved board, and the position of the curved board is changed depending on a zoom ratio of the image capturing unit, wherein the area as irradiated by the first and second light sources is larger than a captured area by the image capturing unit, and wherein an optic axis of the first light source and an optic axis of the second light source are parallel to an optic axis of the image capturing unit; and the surveillance system further comprising a display control unit to control a display to display the captured image;

the monitoring camera further comprising a communication interface configured to transmit the captured image to a remote site.

15. The surveillance system according to claim 14, further comprising a display that is configured to display the captured image.

* * * * *